(12) United States Patent
Kishore et al.

(10) Patent No.: US 11,475,414 B2
(45) Date of Patent: Oct. 18, 2022

(54) METHOD AND SYSTEM FOR ASSIGNING AND TRACKING PROGRESS OF ACTION ITEMS IN A REVIEW MEETING

(71) Applicant: Zensar Technologies Limited, Maharashtra (IN)

(72) Inventors: Sandeep Kishore, Fremont, CA (US); Sumant Kulkarni, Pune (IN); Nitesh Kumar, Pune (IN); Hari Eswar S M, Pune (IN); Aishwarya Chaurasia, Pune (IN); Richa Sawhney, Pune (IN); Shree Krishna Somani, Pune (IN)

(73) Assignee: Zensar Technologies Limited, Maharashtra (IN)

( * ) Notice: Subject to any disclaimer, the term of this patent is extended or adjusted under 35 U.S.C. 154(b) by 0 days.

(21) Appl. No.: 17/129,162

(22) Filed: Dec. 21, 2020

(65) Prior Publication Data
US 2021/0209561 A1 Jul. 8, 2021

(30) Foreign Application Priority Data
Jan. 3, 2020 (IN) .............................. 202021000221

(51) Int. Cl.
*G06Q 10/10* (2012.01)
(52) U.S. Cl.
CPC ................................ *G06Q 10/1095* (2013.01)
(58) Field of Classification Search
CPC ................................................ G06Q 10/1095
See application file for complete search history.

(56) References Cited

U.S. PATENT DOCUMENTS

| 6,754,631 | B1 | 6/2004 | Din |
| 8,554,562 | B2 | 10/2013 | Aronowitz |
| 9,170,993 | B2 | 10/2015 | Kalia et al. |

(Continued)

OTHER PUBLICATIONS

Kochhar, Pavneet Singh, et al. "Understanding the role of reporting in work item tracking systems for software development: an industrial case study." 2018 IEEE International Conference on Software Maintenance and Evolution (ICSME). IEEE, 2018. (Year: 2018).*

(Continued)

*Primary Examiner* — Crystol Stewart
*Assistant Examiner* — Thea Labogin
(74) *Attorney, Agent, or Firm* — Hamre, Schumann, Mueller & Larson, P.C.

(57) ABSTRACT

A method and system for assigning and tracking progress of action items in a review meeting comprises extracting action items from a meeting document during the review meeting once the review meeting is initiated between the reviewee and the reviewer. The method comprises identifying reviewee content and reviewer content by using feature extraction technique on audio snippets spoken by the reviewee and the reviewer during the review meeting. The method further comprises determining whether the review meeting is a first meeting or a subsequent meeting, between the reviewee and the reviewer, for discussing the action items extracted from the meeting document. Based on the determination, action items for reviewee and reviewer are assigned and the status of the previously assigned action items of reviewee and previously assigned action items of reviewer are tracked.

14 Claims, 4 Drawing Sheets

(56) References Cited

U.S. PATENT DOCUMENTS

2014/0278377 A1* 9/2014 Peters ................ G10L 15/1822
                                                                                          704/9
2017/0323643 A1   11/2017 Arslan et al.
2018/0005289 A1* 1/2018 Angell ............... G06Q 30/0613

OTHER PUBLICATIONS

O'Shaughnessy, Douglas. "Interacting with computers by voice: automatic speech recognition and synthesis." Proceedings of the IEEE 91.9 (2003): 1272-1305. (Year: 2003).*

Tur, Gokhan "The Calo Meeting Assistant System", 2010 IEEE Transactions on Audio, Speech, and Language Processing, vol. 18, No. 6., Aug. 2010 (Year: 2010).*

* cited by examiner

METHOD AND SYSTEM FOR ASSIGNING AND TRACKING PROGRESS OF ACTION ITEMS IN A REVIEW MEETING

TECHNICAL FIELD

The present disclosure relates to a field of tracking and reporting information related to progress of action items in a review meeting between a reviewee and a reviewer of an organization.

BACKGROUND OF THE INVENTION

In this digital era, data analytics plays a pivotal role in growth of an organization as the data analytics provides insights about the business process being followed within the organization. This enables the management of the organization to take corrective measures, if some followed practices are not in line with the vision, scope and goals of the organization. One of the important steps towards achieving the goals is persistently reviewing and evaluating the performance of key stakeholders driving the organization verticals.

It has been observed that the review mechanism in organizations has been manually driven, with individuals controlling the data presented to reviewer e.g., CXOs. Reviewer's review requires data from various sources over different time periods which can be amalgamated to reflect trends of organization's bottom line, evaluate performance, and assign action items which would otherwise be overlooked/hidden. Sometimes, the data from the past review meetings, which is relevant for the current discussion points in the agenda, might be overlooked.

Thus, there is need of one or more techniques which helps in automatically pushing points such as assigned action items, status of the action items, data used in previous review meetings etc. in an on-going review meeting so that reviewer can be updated with information such as what had been discussed in the previous review meeting and whether the action items, proposed in those meetings, have realized by the respective stakeholder[s]. However, the technical challenge is to track a huge amount of data being generated in the organization and generate a meaningful information from such tracking. Since in the review meetings multiple parties are involved (reviewer side and reviewee side), another technical challenge is to appropriately understand who said what and what was the conclusion of the meeting. Hence, the challenge is not only limited to analyzing the huge data but also to precisely understand the commitments given during such reviewee meetings and keeping a track on them.

The information disclosed in this background of the disclosure section is only for enhancement of understanding of the general background of the invention and should not be taken as an acknowledgement or any form of suggestion that this information forms the prior art already known to a person skilled in the art.

SUMMARY OF THE INVENTION

The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the claimed disclosure.

In one embodiment of the present disclosure, a method of assigning and tracking progress of action items in a review meeting between a reviewee and a reviewer of an organization is disclosed. The method comprises extracting action items from a meeting document during the review meeting once the review meeting is initiated between the reviewee and the reviewer, wherein the meeting document comprises meeting metadata. The method further comprises identifying reviewee content and reviewer content by using feature extraction technique on audio snippets spoken by the reviewee and the reviewer during the review meeting. The method further comprises determining whether the review meeting is a first meeting or a subsequent meeting, between the reviewee and the reviewer, for discussing the action items extracted from the meeting document. The method further comprises, when the review meeting is determined to be the first meeting, assigning a first reviewee action items and a first reviewer action items corresponding to the action items extracted from the meeting document based on the reviewee content and the reviewer content identified during the review meeting. However, when the review meeting is determined to be the subsequent meeting, the method further comprises determining a status of a previously assigned reviewee action items and a previously assigned reviewer action items and assigning a second reviewee action items and a second reviewer action items based on the status of the previously assigned reviewee action items and previously assigned reviewer action items respectively. The second reviewee action items comprise at least one of a fresh reviewee action items and an extended reviewee action items indicating an extension of the previously assigned reviewee action items. The second reviewer action items comprise at least one of a fresh reviewer action items and an extended reviewer action items indicating an extension of the previously assigned reviewer action items.

In another embodiment of the present disclosure, a system for assigning and tracking progress of action items in a review meeting between a reviewee and a reviewer of an organization is disclosed. The system comprises an extraction unit configured to extract action items from a meeting document during the review meeting once the review meeting is initiated between the reviewee and the reviewer, wherein the meeting document comprises meeting metadata. The system further comprises an identification unit configured to identify reviewee content and reviewer content by using feature extraction technique on audio snippets spoken by the reviewee and the reviewer during the review meeting. The system further comprises a determination unit configured to determine whether the review meeting is a first meeting or a subsequent meeting, between the reviewee and the reviewer, for discussing the action items extracted from the meeting document. The system further comprises an action item generation unit, based on the determining of the first meeting or the subsequent meeting, is configured to perform the following. In one instance, the action item generation unit assigns a first reviewee action items and a first reviewer action items corresponding to the action items extracted from the meeting document based on the reviewee content and the reviewer content identified during the review meeting when the review meeting is determined to be the first meeting. In another instance, the action item generation unit, when the review meeting is determined to be the subsequent meeting, first determines a status of a previously assigned reviewee action items and a previously assigned reviewer action items, and then assigns a second reviewee action items and a second reviewer action items based on the status of the previously assigned reviewee action items and previously assigned reviewer action items respectively. The second reviewee action items comprise at least one of a fresh reviewee action items and an extended reviewee action items indicating an extension of the previously assigned reviewee action items. The second reviewer action items comprise at least one of a fresh reviewer action items and an extended reviewer action items indicating an extension of the previously assigned reviewer action items.

In one embodiment of the present invention, a non-transitory computer-readable storage medium is disclosed. The medium stored instructions that when processed by a processor cause a system to perform operations. The operations comprise extracting action items from a meeting document during the review meeting once the review meeting is initiated between the reviewee and the reviewer, wherein the meeting document comprises meeting metadata. The operations further comprise identifying reviewee content and reviewer content by using feature extraction technique on audio snippets spoken by the reviewee and the reviewer during the review meeting. The operations further comprise determining whether the review meeting is a first meeting or a subsequent meeting, between the reviewee and the reviewer, for discussing the action items extracted from the meeting document. The operations further comprise, when the review meeting is determined to be the first meeting, assigning a first reviewee action items and a first reviewer action items corresponding to the action items extracted from the meeting document based on the reviewee content and the reviewer content identified during the review meeting. However, when the review meeting is determined to be the subsequent meeting, the operations further comprise determining a status of a previously assigned reviewee action items and a previously assigned reviewer action items and assigning a second reviewee action items and a second reviewer action items based on the status of the previously assigned reviewee action items and previously assigned reviewer action items respectively. The second reviewee action items comprise at least one of a fresh reviewee action items and an extended reviewee action items indicating an extension of the previously assigned reviewee action items. The second reviewer action items comprise at least one of a fresh reviewer action items and an extended reviewer action items indicating an extension of the previously assigned reviewer action items.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The embodiments of the disclosure itself, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings in which.

Figure 1:
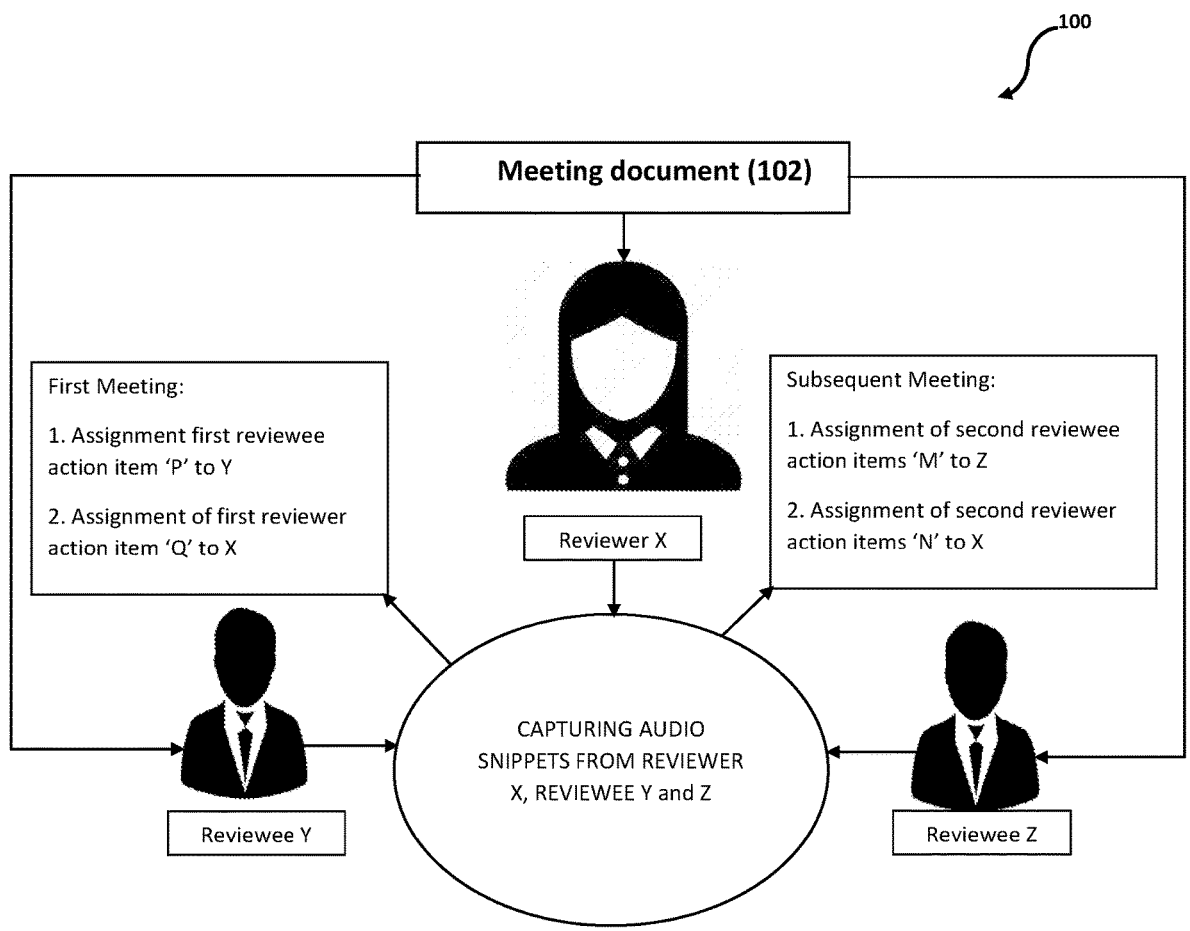
FIG. 1 shows an exemplary environment 100 of review meeting of an organization, in accordance with an embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION OF THE INVENTION

The foregoing has broadly outlined the features and technical advantages of the present disclosure in order that the detailed description of the disclosure that follows may be better understood. It should be appreciated by those skilled in the art that the conception and specific embodiment disclosed may be readily utilized as a basis for modifying or designing other structures for carrying out the same purposes of the present disclosure.

The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Disclosed herein is a method and a system for assigning and tracking progress of action items in a review meeting between a reviewee and a reviewer of an organization. Almost every organization conduct review meetings to analyze organization performance as well as individual performance. In most of the cases, the organizations use manual entries for capturing the points discussed in the review meetings. However, in capturing all the details through manual entry, there are high chances that people may miss to capture some data points from the discussion. Further, entering the data manually and tracking the status of each assigned task manually is quite tedious and is more prone to error. This creates a loophole in tracking the action items assigned to individual and may hamper the overall organization performance for taking timely actions for each action items.

The present disclosure addresses this concern by not only automatically tracking the assigned action items discussed in each review meeting but also assists in taking corrective measures in timely manner. Organization performance trends over the years in the backdrop of industry trends results in better understanding and strategizing future course of plan. It gives the reviewer a chance to view the subject of the review in a better light by broadening comparison set. For example, the reviewer (e.g., CXO) may have a view of how the performance of the business has been for the past many years, how the trend was and if the reviewees have delivered on the actions discussed in all the past meetings. In the absence of the system, the entities would have to perform all the task manually which results in bottlenecks and slippage. Hence, the present disclosure aims to assign the action items to individuals i.e., either reviewer or reviewee and tracking the performance of individual for the assigned action item. The information related to reviewer, reviewee both are present in the organization database and the system based on the reviewer and reviewee information and assigned action items may track the progress of action items and take corrective measures to complete the action items in timely manner.

The present disclosure takes inputs from various sources (such as review documents, review recording, historic performance data, web data etc.) to give a holistic view about organization performance as well as extract key action items from each of the review meetings, all with the motive of enhancing the decision making process in review meetings. The upcoming paragraphs of the specification explains how the both the data types (structured and unstructured) are used to assign the action items to individual and how the progress of each action item is mapped with the Organization performance.

FIG. 1 shows an exemplary environment 100 of a system for assigning and tracking progress of action items in a review meeting between a reviewee and a reviewer of an organization in accordance with an embodiment of the present disclosure. It must be understood to a person skilled in art that the present invention may also be implemented in various environments, other than as shown in FIG. 1.

Figure 2:
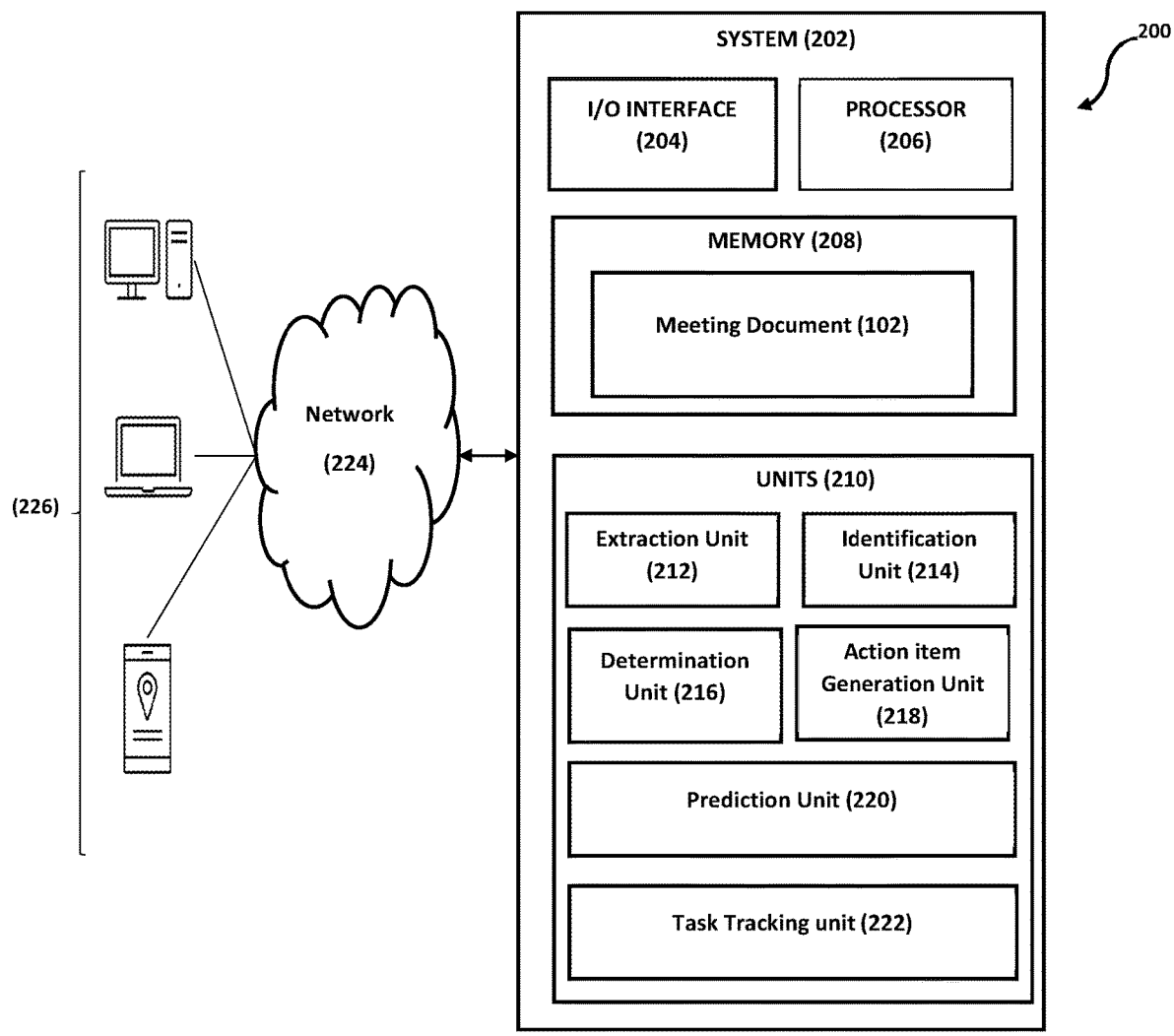
FIG. 2 shows a block diagram 200 of a system for assigning and tracking progress of action items in a review meeting between a reviewee and a reviewer of an organization, in accordance with an embodiment of the present disclosure.

The detailed explanation of the exemplary environment 100 is explained in conjunction with FIG. 2 that shows a block diagram 200 of a system for assigning and tracking progress of action items in a review meeting between a reviewee and a reviewer of an organization, in accordance with an embodiment of the present disclosure. Although the present disclosure is explained considering that the system 202 is implemented on a server, it may be understood that the system 202 may be implemented in a variety of computing systems, such as a laptop computer, a desktop computer, a notebook, a workstation, a mainframe computer, a server, a network server, a cloud-based computing environment. It may be understood that the system 202 may be accessed by multiple users such as reviewer and reviewee through one or more user devices 226 or applications residing on the user devices. In one implementation, the system 202 may comprise the cloud-based computing environment in which a user may operate individual computing systems configured to execute remotely located applications. Examples of the user devices 226 may include, but are not limited to, a IoT device, IoT gateway, portable computer, a personal digital assistant, a handheld device, and a workstation. The user devices 226 are communicatively coupled to the system 202 through a network 224.

In one implementation, the network 224 may be a wireless network, a wired network or a combination thereof. The network 224 can be implemented as one of the different types of networks, such as intranet, local area network (LAN), wide area network (WAN), the internet, and the like. The network 224 may either be a dedicated network or a shared network. The shared network represents an association of the different types of networks that use a variety of protocols, for example, Hypertext Transfer Protocol (HTTP), Hypertext Transfer Protocol Secure (HTTPS), Transmission Control Protocol/Internet Protocol (TCP/IP), Wireless Application Protocol (WAP), and the like, to communicate with one another. Further the network 224 may include a variety of network devices, including routers, bridges, servers, computing devices, storage devices, and the like.

In one implementation, the system 202 may comprise an I/O interface 204, a processor 206, a memory 208 and the units 210. The memory 208 may be communicatively coupled to the processor 206 and the units 210. Further, the memory 208 may store a meeting document 102. The significance and use of meeting document 102 is explained in the upcoming paragraphs of the specification. The processor 206 may be implemented as one or more microprocessors, microcomputers, microcontrollers, digital signal processors, central processing units, state machines, logic circuitries, and/or any devices that manipulate signals based on operational instructions. Among other capabilities, the processor 206 is configured to fetch and execute computer-readable instructions stored in the memory 208. The I/O interface 204 may include a variety of software and hardware interfaces, for example, a web interface, a graphical user interface, and the like. The I/O interface 204 may allow the system 202 to interact with the user directly or through the user devices 228. Further, the I/O interface 204 may enable the system 202 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting many devices to one another or to another server.

In one implementation, the units 210 may comprise an extraction unit 212, an identification unit 214, a determination unit 216, an action item generation unit 218, a prediction unit 220, and a task tracking unit 222. According to embodiments of present disclosure, these units 212-222 may comprise hardware components like processor, microprocessor, microcontrollers, application-specific integrated circuit for performing various operations of the system 202. It must be understood to a person skilled in art that the processor 206 may perform all the functions of the units 212-222 according to various embodiments of the present disclosure.

Now, referring back to FIG. 1, the environment 100 shows scenario of an on-going review meeting of an organization. The participants of the review meeting may be one or more reviewees and one or more reviewers. In an exemplary embodiment, for ease of understanding, the participants of the review meeting are considered as one reviewee and one reviewer throughout the specification. However, in another embodiment, the number of reviewees may be more than the number of reviewers (as presented in FIG. 1). In another embodiment, the number of reviewees may be less than the number of reviewers. It may be understood to a person skilled in art that the review meeting may be conducted within the organization or between two or more organizations, in which, the reviewee and reviewer may be placed in different permutations and combinations. For example, if the reviewee meeting is scheduled within the organization only, then obviously the reviewer and the reviewee would belong to the same organization. However, in case the meeting is scheduled between two different organizations (client & service provider) or two different stakeholders of same organization, the reviewer and the reviewee may be placed accordingly.

Prior to the review meeting or in the on-going review meeting, the reviewer or the reviewee may access the information present in a meeting document 102. The meeting document 102 pertaining to the review meeting between the reviewer and the reviewee using a user device 226 connected to the system 202. The meeting document 102 comprises meeting metadata such as client related information (e.g., name, financial information, social media information, news etc.), organization related information (e.g., employee details, action items assigned to various individuals such as reviewer and reviewee), reviewee's name, reviewer name, information related to the topics discussed during the last meetings, meeting notes, client discussed in the meeting etc. The meeting metadata may be presented in form of review documents, recording, multimedia content etc.

Once the review meeting is scheduled or initiated between the reviewer and the reviewee, the extraction unit 212 extracts action items from the meeting document 102. These action items may indicate various tasks/information present in the meeting document 102 which may be useful for successfully conducting the reviewee meeting. According to an example shown in FIG. 1, the review meeting may be initiated between the reviewer 'X' and the reviewee 'Y', in which, they may refer to a particular client 'A'. It may be understood to the skilled person that this scenario talks about the reviewee meeting happening "within the organization" for discussing a strategy to pitch the client 'A'. However, according to other embodiments, the reviewee meeting may also happen in different scenarios, in which, client 'A' may not be an external party and may be another department or another stakeholder of same organization. Hence, the forgoing explanation considering the reviewee meeting happening "within the organization" shall not limit scope of the present disclosure.

Now, as soon as the reviewee meeting is initiated and client 'A' is discussed, the details or information related to client 'A' is presented in the reviewee meeting from the meeting document 102. According to an embodiment, the extraction unit 212 may also extract the information related to client 'A' and provide the same when the meeting document 102 is accessed during the reviewee meeting.

The extraction unit 212 may capture client's financial information, social media information and news related to the client 'A'. For example, the financial information of the client 'A' may include stocks, balance sheet and their performance details. For financial information extraction, the extraction unit 212 may refer to a list of pre-defined financial websites based on client or company name. These websites may be searched to get the information in the form of html content about the client under discussion e.g client 'A'. Once pages of the websites are crawled or searched, html content of these pages is parsed to extract the information regarding stock prices and revenue. This can be done by defining templates using tools such as Parsehub or by using open source libraries like DEPTA. The extracted information is then presented in a tabular format (as presented in TABLE-1) which clearly defines the revenue and growth of the client or company over a period with the help of financial statistics.

For the same client 'A', the extraction unit 212 may extract social media content which may affect the performance of client 'A' in near future. For extracting data from social media, a query related to the client 'A' may be used and the information of the client over the social media is extracted. Particularly, this type of information indicates the opinion of the people about the client and same is used for sentiment analysis. According to the embodiments, the extraction unit 212 may use various cloud application programming interfaces to perform this task.

Social Media Details and Sentiment Analysis:
   A wins 2 Diamond awards at ITSMA's Annual Marketing Excellence awards 2020
   A commented on slum area cleanliness drive

TABLE 2

|  | Mean | STD. | Max | Min | 5% | 50% | 95% |
|---|---|---|---|---|---|---|---|
| Average Sentiment | 0.09 | 0.24 | 0.83 | −0.78 | −0.20 | 0.00 | 0.60 |
| Number of News Items | 5.18 | 11.69 | 830 | 0 | 0 | 2 | 22 |

Further, for extracting news about the client 'A', the extraction unit 212 may extracts a list of news and summarize the same in below format:
   A, xyz university partner to enhance end to end learning
   "PQRS" company selects A to build first Neo-non-bank In this way, the client 'A' information may be gathered from various resources and amalgamated in a single document named client 'A' related information. This client 'A' related information may be presented for client 'A' in the meeting document 102 as soon as the client 'A' is under consideration during the review meeting. Further, such type of information of client 'A' may be used to train a model that predicts the revenue for the next quarter for the client 'A'. This forecast may be performed by the prediction unit 220 using models such Auto Regressive Integrated Moving Average (ARIMA), Long Short Term Memory (LSTM) etc. In another embodiment, information related to each of the client which is discussed between the participants of the review meeting may be extracted. In this way, the client information may be used to forecast the revenue of the client in a particular period like quarterly or monthly or annually.

Similarly, the extraction unit 212 may also extract the organization related information from the internal database. The organization related information may comprise a list of members, their designation, hierarchical information of the member, escalation matrix etc. Further, the organization information may also include balance sheets, historic revenue data that the organization has earned from each client. As the client related information is used to forecast the client revenue for a particular period like quarter (explained in above paragraphs), similarly, the prediction unit 220 may forecast organization's performance considering the similar parameters like financial information, social media information and news.

TABLE 1

| QUARTERLY | DECEMBER 2020 | SEPTEMBER 2020 | JUNE 2020 | MARCH 2020 | DECEMBER 2019 |
|---|---|---|---|---|---|
| Total Income | 20,140.00 | 24,140.00 | 23,881.00 | 23,919.00 | 23,255.00 |
| Total Income Growth (%) | 4.54 | 1.08 | −0.16 | 2.86 | 3.18 |
| Total Expenses | 18,400.00 | 18,300.00 | 18,340.00 | 18,028.00 | 17,717.00 |
| Total Expenses Growth (%) | 0.43 | −0.22 | 1.73 | 1.76 | 2.22 |

During the on-going reviewee meeting, another important aspect is to understand the communication between the reviewer and the reviewee. That is, what reviewee and reviewer discussed and finalized in the reviewee meeting to meet their agenda. For this, the identification unit 214 may identify reviewee content and reviewer content by using feature extraction technique on audio snippets spoken by the reviewee and the reviewer during the review meeting. Particularly, the audio snippets of participants present in the review meeting are analysed by the feature extraction technique for identification of the reviewee content and the reviewer content. According to an embodiment, the identification unit 214, at first, may apply a first-order finite impulse response (FIR) filter on the audio snippets generated by the both the reviewee and the reviewer during the reviewee meeting. Then, the audio snippets are partitioned into frames. Partitioning is performed to remove the acoustic interface present in the start and end of speech signals present in the audio snippets. The framed audio snippets are then windowed. Thereafter, a Bandpass filter is applied to the framed audio snippets to minimize disjointedness at the start and finish of each frame. For example, techniques like Hamming window or Rectangular window are used to increases the sharpness of harmonics, eliminates the discontinuity in the speech signal by tapering beginning and ending of the frame zero. It also reduces the spectral distortion formed by the overlap. Based on the applying of the Bandpass filter, audio features are extracted from the framed audio snippets by using the feature extraction technique. The audio features extracted may comprises, but not limited to, pitch information, intensity information, timbre information, and timestamp information. According to an embodiment, the feature extraction technique used may include, but not limited to, Mel Frequency Cepstral Coefficients (MFCC), Linear Prediction Coefficients (LPC), Linear Prediction Cepstral Coefficients (LPCC), Line Spectral Frequencies (LSF), Discrete Wavelet Transform (DWT) and Perceptual Linear Prediction (PLP). In an exemplary embodiment, the present disclosure uses MFCC or LPCC techniques for feature extraction as both of these techniques provides high accuracy as well as computation speed.

After extracting the audio features such as pitch information, intensity information, timbre information, and timestamp information from the framed audio snippets, the identification unit 214 performs clustering to identify the cluster of audio snippets related to the reviewer content and related to the reviewee content. The present disclosure uses a technique, in which, it considers that since the reviewee presents the document/presentation during the review meeting, the audio snippets related to the reviewee may always be higher than the reviewer. Thus, according to this technique, the set of reviewee audio-snippets may have higher number of clusters than the set of reviewer audio-snippets. This way, the identification unit 214 tags the audio snippets with majority of audio features by reviewee's name. To the remaining clusters of framed audio snippets (which belongs to reviewer) the identification unit 214 tags the remaining audio snippets by reviewer's name. For tagging the reviewee name and reviewer name to the audio snippets, the identification unit 214 may extract the reviewee name and reviewer name from the meeting metadata present in the meeting documents 102. As defined discussed earlier, the meeting metadata may be present in a pre-defined format/template which helps the system to recognize all the participant names (i.e. reviewer name and reviewee name) present in the review meeting.

In another embodiment, there may be more than two participants present in the review meeting. In such scenario, after extracting the audio features by using the feature extraction technique and then clustering the audio snippets based on extracted audio features, the identification unit 214 may identify that the most populated cluster of audio features as the reviewee content who is presenting the content during the review meeting. Accordingly, the identification unit 214 may tag the time interval for which the reviewee content is present in the audio snippets by reviewee name. All remaining audio snippets which do not belong to reviewee are collected and clustered, the cluster which has maximal presence of audio features of same individual across the review meeting (i.e. other than the reviewee) is tagged with the reviewer name.

Post identification of the reviewee and the reviewer content, in next step, the determination unit 216 may determine whether the review meeting is a first meeting or a subsequent meeting, between the reviewee and the reviewer, for discussing the action items extracted from the meeting document 102. For example, it is determined that for discussion of action items 'P' and 'Q', the review meeting is held for the first time (as shown in FIG. 1), then the determination unit 216 may consider the review meeting as first review meeting for action items 'P' and 'Q'. However, if the historical data is present for the same action items or the same action items are discussed in one or more past review meetings between same set of reviewer and reviewee, then the review meeting may be considered as subsequent meeting for those action items. In an exemplary embodiment, the review meeting between the reviewer 'X' and the reviewee 'Y' is determined as the first meeting whereas the review meeting between the reviewer 'X' and the reviewee 'Z' is determined as subsequent meeting (as shown in FIG. 1).

After successful determination of the reviewee meeting as the first meeting, the action item generation unit 218 may assign a first reviewee action items (i.e. 'P' and 'Q') and a first reviewer action items to the reviewee and reviewer respectively. The first reviewee action items and first reviewer action items may correspond to the action items extracted from the meeting document 102 by the extraction unit 212. The action items generation unit 218 may determine the first reviewee action items and the first reviewer action items to be assigned to the reviewee or reviewer based on the reviewee content and the reviewer content identified during the review meeting.

However, it may so happen that the review meeting may not be first time meeting, and however may be subsequent or follow-up meeting. In such a scenario, the action item generation unit 218 may determine a status of a previously assigned reviewee action items and a previously assigned reviewer action items either by using a task tracking unit 222 or by using natural language processing (NLP) technique on the reviewee content and reviewer content extracted from the audio snippets. In an exemplary embodiment, the action item generation unit 218 may determine the status of the previously assigned reviewee action items and previously assigned reviewer action items by using the task tracking unit 222. The task tracking unit 222 may keep on updating the status of the reviewee and reviewer action items in a pre-defined time interval. The pre-defined interval may be a day, a week, a fortnight, a month, any time prior to the subsequent review meeting or time interval defined by a user. In another embodiment, the action item generation unit 218 may determine the status of the previously assigned reviewee action items and the previously assigned reviewer action items by using the reviewee content and the reviewer content extracted during the review meeting. The action item generation unit 218 may apply the Natural NLP technique to extract the keyword for the particular action items which were previously assigned to reviewee and/or reviewer. Particularly, the action item generation unit 218 may identify the inputs provided by the reviewee or reviewer on performance of action items or for each other performance. For example, when the reviewee has communicated during the meeting that previously assigned action item "PQR" has been COMPLETED then the action item generation unit 218 may assign the status of previously assigned action item "PQR" as COMPLETE through NLP. On the other hand, when the reviewee or reviewer communicate during the reviewee meeting that the previously assigned action item "PQR" is not completed then the action item generation unit 218 may consider the status as PENDING. By use of voice diarisation, the action item generation unit 218 may also determine the explanation or reasoning provided by the participants for positive or negative result obtained in a particular action item. For example, reviewee 'Z' may provide a reasoning for non-completion of action item "PQR" then the remarks or explanation provided by the reviewee 'Z' is stored in the meeting documents 102.

In an exemplary embodiment, after determination of status of the previously assigned reviewee action items and previously assigned reviewer action items as COMPLETE, the action item generation unit 218 may generate a second reviewee action items (e.g 'M' as shown in FIG. 1) and a second reviewer action items (e.g 'N' as shown in FIG. 1). According to one embodiment, the second reviewee action items may be a fresh reviewee action item and a fresh reviewer action item. However, according to another embodiment, the second reviewee action items and the second reviewer action items may be an extended reviewee action items and extended reviewer action items. The extended reviewee action item and extended reviewer action items are extension of the previously assigned reviewee action items and the previously assigned reviewer action items respectively. Further, after determination of status of the previously assigned reviewee action items and/or previously assigned reviewer action items as PENDING, the action item generation unit 218 may also send a reminder to the concerned reviewer and/or concerned reviewee, respectively.

Thus, in this manner, the system 202 performs all the activities such as assigning action items and tracking action items of each of the participant (reviewer and reviewee) of the review meeting. From the on-going discussion, in real-time, the system 202 may also prepare meeting notes in textual, audio or video format from which it may extract the information related to action items and based on the discussion or conversation between the reviewee and reviewer. The system 202 may also be able to identify the content shared by the reviewee and the reviewer which may be used at later stage for briefing the other participants about the viewpoint of reviewee and reviewer for the same action items on which discussion was held in the review meeting. Further, the meeting document prepared in current or on-going meeting may become a pre-review meeting document for a subsequent review meeting. The pre-review meeting document can serve as a template for briefing the participants about the earlier discussions for the same action items and may also serve as a reference for the on-going meeting between the reviewer and reviewee.

In order to elucidate the aforementioned functioning, consider an example where a statement is being recorded in the audio snippets.

Statement—"Subject Verb Object by Date"

Upon analyzing the voice recording using the NLP techniques, the extraction unit 212 extracts keywords i.e. Subject as Person Name/Action Item Owner, Verb as Exhaustive list of Action items such as "Follow-up", "Action", "To-do", etc., Object as Action Item Object, and Date as Follow-up/Due Date which also signifies Criticality. In this statement, the identification unit 214 identifies the reviewee or reviewer associated with the content present in the audio snippets and accordingly picks up the action items assigned to reviewee or reviewer along with deadline upon identification of keywords from the statement.

Figure 3:
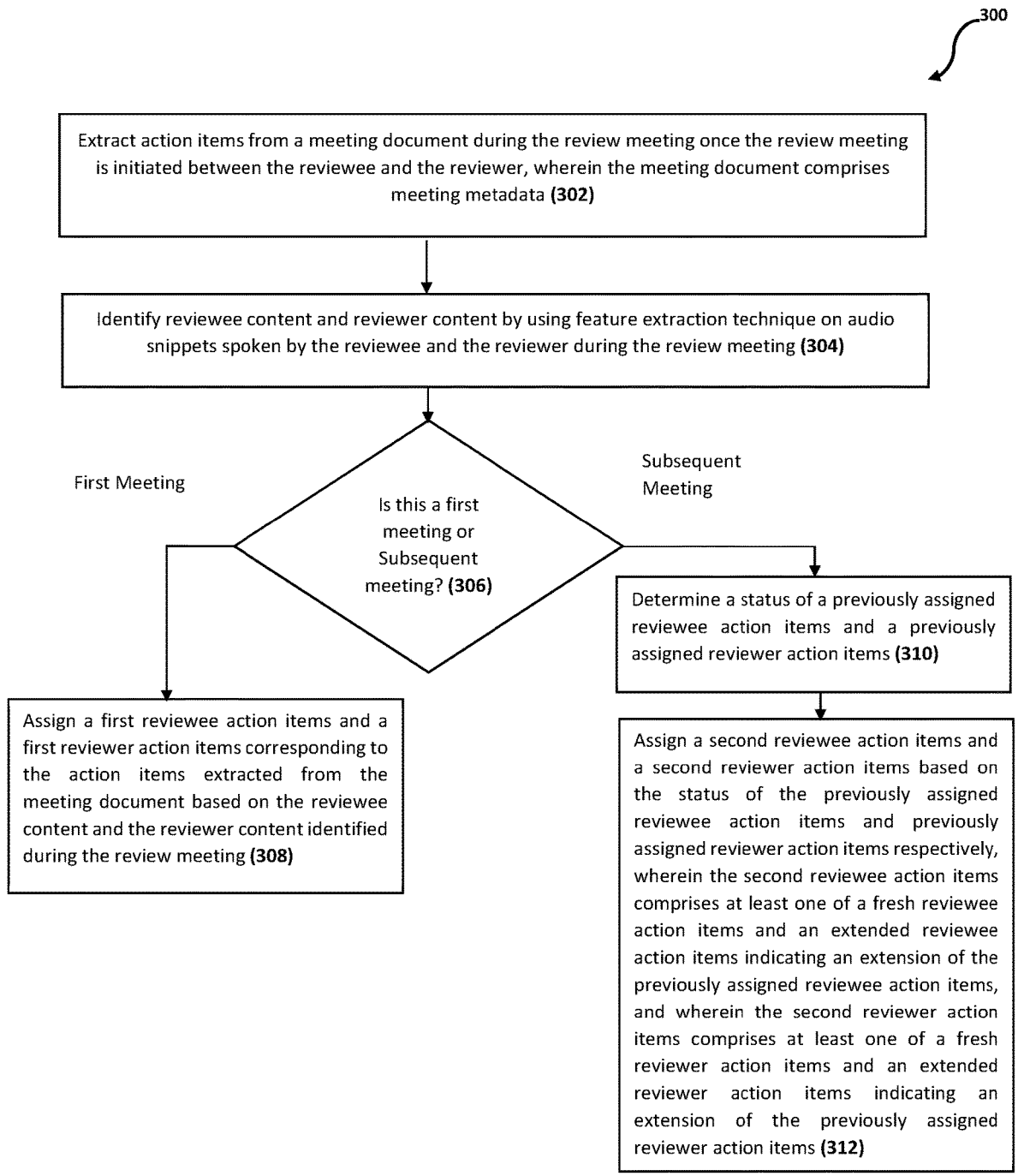
FIG. 3 shows a method 300 for assigning and tracking progress of action items in a review meeting between a reviewee and a reviewer of an organization, in accordance with an embodiment of the present disclosure.

The above steps for assigning and tracking progress of action items in a review meeting of the Organization is explained with the help of FIG. 3. As illustrated in FIG. 3, the method 300 includes one or more blocks illustrating a method for assigning and tracking progress of action items in a review meeting between a reviewee and a reviewer of an organization. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein.

At block 302, the method 300 may comprise extracting action items from a meeting document during the review meeting once the review meeting is initiated between the reviewee and the reviewer, wherein the meeting document comprises meeting metadata. The meeting metadata present in the meeting document 102 may comprises client related information, organization related information, reviewee name, reviewer name, call recordings, review documents etc. that may help in extracting the action items used for the review meeting. The meeting metadata may be presented in structured or unstructured format such as text, multimedia content, social media article, news summaries, financial trends, market stocks etc.

At block 304, the method 300 may comprise identifying reviewee content and reviewer content by using feature extraction technique on audio snippets spoken by the reviewee and the reviewer during the review meeting. The feature extraction technique such as Mel Frequency Cepstral Coefficients (MFCC), Linear Prediction Coefficients (LPC), Linear Prediction Cepstral Coefficients (LPCC), Line Spectral Frequencies (LSF), Discrete Wavelet Transform (DWT) and Perceptual Linear Prediction (PLP) may be used to extract the audio features from the audio snippets. These techniques provide higher accuracy and computational speed which helps in extracting the features from the audio snippets. Further, clustering of the audio features is performed, and the most populated cluster indicates the features pertinent to the presenter/reviewee and the audio intervals corresponding to these clusters are tagged with the reviewee name. Further, remaining cluster is treated as clusters with non-reviewee features. These clusters are extracted and the cluster which has maximal presence across the entire review meeting is tagged for reviewer and the audio interval corresponding to these clusters are tagged with reviewer name.

At block 306, the method 300 may comprise determining whether the review meeting is a first meeting or a subsequent meeting, between the reviewee and the reviewer, for discussing the action items extracted from the meeting document. Based on the reviewee content and reviewer content and the extracted action items discussed during the review meeting, the task tracking unit may determine that the action items discussed in the review meeting are discussed for the first time or are discussed earlier as well.

At block 308, the method 300 may comprise, when the meeting is determined to be the first meeting, assigning a first reviewee action items and a first reviewer action items corresponding to the action items extracted from the meeting document based on the reviewee content and the reviewer content identified during the review meeting. The first reviewee action items and the first reviewer action items are the actions items extracted from the meeting document.

At block 310, the method 300 may comprise, when the meeting is determined to be as subsequent review meeting, determining a status of a previously assigned reviewee action items and a previously assigned reviewer action items. As the action items are already discussed in previous meeting(s) and the assignment of the action items to a reviewee or reviewer has already happened therefore, the action items are considered as the previously assigned reviewee action items and previously assigned reviewer action items. The status of the previously assigned reviewee action items and previously assigned reviewer action items can be determined by using the task tracking unit or by using the NLP technique over the reviewee content and reviewer content.

At block 312, the method 300 may comprise assigning a second reviewee action items and a second reviewer action items based on the status of the previously assigned reviewee action items and previously assigned reviewer action items respectively. The second reviewee action items comprise at least one of a fresh reviewee action items and an extended reviewee action items indicating an extension of the previously assigned reviewee action items. Whereas the second reviewer action items comprise at least one of a fresh reviewer action items and an extended reviewer action items indicating an extension of the previously assigned reviewer action items.

Computer System

Figure 4:
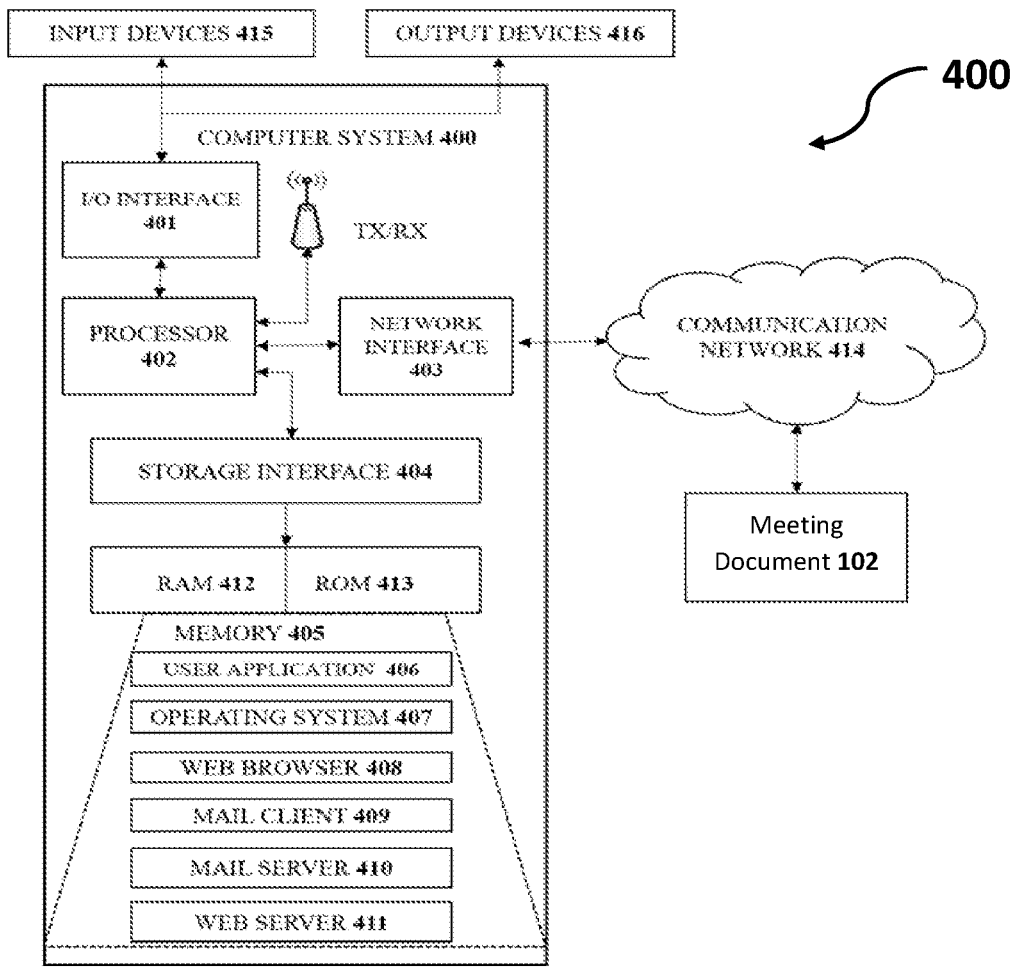
FIG. 4 shows a block diagram of an exemplary computer system 400 for implementing the embodiments consistent with the present disclosure.

FIG. 4 illustrates a block diagram of an exemplary computer system 400 for implementing embodiments consistent with the present disclosure. It may be understood to a person skilled in art that the computer system 400 and its components is similar to the system 202 referred in FIG. 2. In an embodiment, the computer system 400 may be a peripheral device, which is used for facilitating systematic escalation of information related to an event in an organizational hierarchy. The computer system 400 may include a central processing unit ("CPU" or "processor") 402. The processor 402 may comprise at least one data processor for executing program components for executing user or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n /b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface, the computer system 400 may communicate with one or more I/O devices.

In some embodiments, the processor 402 may be disposed in communication with a communication network 414 via a network interface 403. The network interface 403 may communicate with the communication network 414. The communication unit may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 414 can be implemented as one of the several types of networks, such as intranet or Local Area Network (LAN) and such within the organization. The communication network 414 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 414 may include a variety of network devices, including routers, bridges, servers, computing devices, storage devices, etc.

In some embodiments, the processor 402 may be disposed in communication with a memory 405 (e.g., RAM 412, ROM 413, etc. as shown in FIG. 4) via a storage interface 404. The storage interface 404 may connect to the memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application, an operating system, a web browser, mail client, mail server, web server and the like. In some embodiments, computer system may store user/application data, such as the data, variables, records, etc. as described in this invention. Such databases may be implemented as fault-tolerant, relational, scalable, secure databases such as OracleR or SybaseR.

The operating system may facilitate resource management and operation of the computer system. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computer system, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT™ WINDOWS™ (XP™, VISTA™/7/8, 10 etc.), Unix® X-Windows, web interface libraries (e.g., AJAX™, DHTML™, ADOBE® FLASH™, JAVASCRIPT™, JAVA™, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERENCE NUMERALS

| Reference Numeral | Description |
| --- | --- |
| 100 | Environment |
| 102 | Meeting Document |
| 202 | System |
| 204 | I/O interface |
| 206 | Processor |
| 208 | Memory |
| 210 | Units |
| 212 | Extraction unit |
| 214 | Identification Unit |
| 216 | Determination unit |
| 218 | Action item generation unit |
| 220 | Prediction unit |
| 222 | Task tracking unit |
| 224 | Network |
| 226 | Nodes |
| 300 | Method |
| 302-312 | Method steps |

The invention claimed is:

1. A method of assigning and tracking progress of action items in a review meeting between a reviewee and a reviewer of an organization, the method comprising:
   extracting action items from a meeting document during the review meeting once the review meeting is initiated between the reviewee and the reviewer, wherein the meeting document comprises meeting metadata;
   identifying reviewee content and reviewer content to extract audio features including pitch information, intensity information, timbre information, and timestamp information by using feature extraction technique on audio snippets spoken by the reviewee and the reviewer during the review meeting, wherein the identifying the reviewee content and reviewer content further comprises:
      applying a first-order finite impulse response (FIR) filter on the audio snippets generated by both the reviewee and the reviewer during the review meeting,
      partitioning, the audio snippets after applying the FIR filter, into a plurality of frames thereby forming framed audio snippets,
      applying a bandpass filter to the framed audio snippets to extract audio features of the framed audio snippets by using the feature extraction technique, wherein the feature extraction technique comprises at least one of Mel Frequency Cepstral Coefficients (MFCC), Linear Prediction Coefficients (LPC), Linear Prediction Cepstral Coefficients (LPCC), Line Spectral Frequencies (LSF), Discrete Wavelet Transform (DWT) and Perceptual Linear Prediction (PLP), and wherein the audio features comprises at least one of pitch information, intensity information, timbre information, and timestamp information,
      clustering the framed audio snippets based on the audio features into a set of reviewee audio-snippets and a set of reviewer audio-snippets such that the set of reviewee audio-snippets have higher number of clusters than the set of reviewer audio-snippets, and
      tagging the reviewee name and the reviewer name to the set of reviewee audio-snippets and the set of reviewer audio-snippets;
   determining whether the review meeting is a first meeting or a subsequent meeting, between the reviewee and the reviewer, for discussing the action items extracted from the meeting document;
   performing, based on the determining of the first meeting or the subsequent meeting, at least one of:
      when the review meeting is determined to be the first meeting, assigning a first reviewee action items and a first reviewer action items corresponding to the action items extracted from the meeting document based on the reviewee content and the reviewer content identified during the review meeting; and when the review meeting is determined to be the subsequent meeting, determining a status of a previously assigned reviewee action items and a previously assigned reviewer action items; and assigning a second reviewee action items and a second reviewer action items based on the status of the previously assigned reviewee action items and previously assigned reviewer action items respectively, wherein the second reviewee action items comprises at least one of a fresh reviewee action items and an extended reviewee action items indicating an extension of the previously assigned reviewee action items, and wherein the second reviewer action items comprises at least one of a fresh reviewer action items and an extended reviewer action items indicating an extension of the previously assigned reviewer action items.

2. The method as claimed in claim 1, wherein the meeting metadata comprises at least one of client related information, organization related information, reviewee name and reviewer name attending the review meeting.

3. The method as claimed in claim 1, wherein the determining the status of the previously assigned reviewee action items and the previously assigned reviewer action items comprises:

extracting the status from the task tracking unit or from the reviewee content and the reviewer content using a Natural Language Processing (NLP) technique.

4. The method as claimed in claim 3, further comprising:

reviewing completion of the previously assigned reviewee action items and the previously assigned reviewer action items in a predefined time-interval; and performing, based on the reviewing of the completion, at least one of:

updating the status as COMPLETED, when the previously assigned reviewee action items and the previously assigned reviewer action items are completed by the reviewee and reviewer respectively in the predefined time-interval; and updating the status as PENDING, when the previously assigned reviewee action items and previously assigned reviewer action items are not completed by the reviewee and the reviewer respectively in the predefined time-interval.

5. The method as claimed in claim 4, further comprising:

assigning the fresh reviewee action items and the fresh reviewer action items to the reviewee and the reviewer respectively when the status of the previously assigned reviewee action items and the previously assigned reviewer action items are determined as COMPLETED; and sending a reminder to the reviewer and the reviewee respectively, when the status is determined as PENDING for at least one of the previously assigned reviewee action items and the previously assigned reviewer action items.

6. The method as claimed in claim 1, wherein the extracting action items further comprises:

performing sentiment analysis on data extracted from one or more sources;

summarizing the data, extracted from the one or more sources, in the meeting document to the reviewer and reviewee; and forecasting meaningful insights based on the summarization by using at least one of an Auto Regressive Integrated Moving Average (AMNIA) and Long Short Term Memory (LSTM).

7. A system for assigning and tracking progress of action items in a review meeting between a reviewee and a reviewer of an organization, the system comprising:

an extraction unit configured to extract action items from a meeting document during the review meeting once the review meeting is initiated between the reviewee and the reviewer, wherein the meeting document comprises meeting metadata;

an identification unit configured to identify reviewee content and reviewer content to extract audio features including pitch information, intensity information, timbre information, and timestamp information by using feature extraction technique on audio snippets spoken by the reviewee and the reviewer during the review meeting, wherein the identification unit is configured to identify reviewee content and reviewer content by:

applying a first-order finite impulse response (FIR) filter on the audio snippets generated by both the reviewee and the reviewer during the review meeting, partitioning, the audio snippets after applying the FIR filter, into a plurality of frames thereby forming framed audio snippets, applying a bandpass filter to the framed audio snippets to extract audio features of the framed audio snippets by using the feature extraction technique, wherein the feature extraction technique comprises at least one of Mel Frequency Cepstral Coefficients (MFCC), Linear Prediction Coefficients (LPC), Linear Prediction Cepstral Coefficients (LPCC), Line Spectral Frequencies (LSF), Discrete Wavelet Transform (DWT) and Perceptual Linear Prediction (PLP), and wherein the audio features comprises at least one of pitch information, intensity information, timbre information, and timestamp information, clustering the framed audio snippets based on the audio features into a set of reviewee audio-snippets and a set of reviewer audio-snippets such that the set of reviewee audio-snippets have higher number of clusters than the set of reviewer audio-snippets, and tagging the reviewee name and the reviewer name to the set of reviewee audio-snippets and the set of reviewer audio-snippets;

a determination unit configured to determine, whether the review meeting is a first meeting or a subsequent meeting, between the reviewee and the reviewer, for discussing the action items extracted from the meeting document; and an action item generation unit, based on the determining of the first meeting or the subsequent meeting, is configured to perform at least one of:

when the review meeting is determined to be the first meeting, assign a first reviewee action items and a first reviewer action items corresponding to the action items extracted from the meeting document based on the reviewee content and the reviewer content identified during the review meeting; and when the review meeting is determined to be the subsequent meeting, determine a status of a previously assigned reviewee action items and a previously assigned reviewer action items; and assign a second reviewee action items and a second reviewer action items based on the status of the previously assigned reviewee action items and previously assigned reviewer action items respectively, wherein the second reviewee action items comprises at least one of a fresh reviewee action items and an extended reviewee action items indicating an extension of the previously assigned reviewee action items, and wherein the second reviewer action items comprises at least one of a fresh reviewer action items and an extended reviewer action items indicating an extension of the previously assigned reviewer action items.

8. The system as claimed in claim 7, wherein the meeting metadata comprises at least one of client related information, organization related information, reviewee name and reviewer name attending the review meeting.

9. The system as claimed in claim 7, wherein the determination unit is configured to determine the status of the previously assigned reviewee action items and the previously assigned reviewer action items by:
   extracting the status from the task tracking unit or from the reviewee content and the reviewer content using a Natural Language Processing (NLP) technique.

10. The system as claimed in claim 9, further comprising a task tracking unit configured to:
    review completion of the previously assigned reviewee action items and the previously assigned reviewer action items in a predefined time-interval; and
    perform, based on the reviewing of the completion, at least one of:
    update the status as COMPLETED, when the previously assigned reviewee action items and the previously assigned reviewer action items are completed by the reviewee and reviewer respectively in the predefined time-interval; and
    update the status as PENDING, when the previously assigned reviewee action items and the previously assigned reviewer action items are not completed by the reviewee and the reviewer respectively in the predefined time-interval.

11. The system as claimed in claim 10, wherein the action item generation unit is further configured to:
    assign the fresh reviewee action items and the fresh reviewer action items to the reviewee and the reviewer respectively when the status of the previously assigned reviewee action items and the previously assigned reviewer action items is determined as COMPLETED; and
    send a reminder to the reviewer and the reviewee respectively when the status is determined as PENDING for at least one of the previously assigned reviewee action items and the previously assigned reviewer action items.

12. A non-transitory computer-readable storage medium including instructions stored thereon that when processed by a processor cause a system to perform operations comprising:
    extracting action items from a meeting document during the review meeting once the review meeting is initiated between the reviewee and the reviewer, wherein the meeting document comprises meeting metadata;
    identifying reviewee content and reviewer content to extract audio features including pitch information, intensity information, timbre information, and timestamp information by using feature extraction technique on audio snippets spoken by the reviewee and the reviewer during the review meeting, wherein the reviewee content and the reviewer content are identified by:
       applying a first-order finite impulse response (FIR) filter on the audio snippets generated by both the reviewee and the reviewer during the review meeting,
       partitioning, the audio snippets after applying the FIR filter, into a plurality of frames thereby forming framed audio snippets,
       applying a bandpass filter to the framed audio snippets to extract audio features of the framed audio snippets by using the feature extraction technique, wherein the feature extraction technique comprises at least one of Mel Frequency Cepstral Coefficients (MFCC), Linear Prediction Coefficients (LPC), Linear Prediction Cepstral Coefficients (LPCC), Line Spectral Frequencies (LSF), Discrete Wavelet Transform (DWT) and Perceptual Linear Prediction (PLP), and wherein the audio features comprises at least one of pitch information, intensity information, timbre information, and timestamp information,
       clustering the framed audio snippets based on the audio features into a set of reviewee audio-snippets and a set of reviewer audio-snippets such that the set of reviewee audio-snippets have higher number of clusters than the set of reviewer audio-snippets, and
       tagging the reviewee name and the reviewer name to the set of reviewee audio-snippets and the set of reviewer audio-snippets;
    determining whether the review meeting is a first meeting or a subsequent meeting, between the reviewee and the reviewer, for discussing the action items extracted from the meeting document;
    performing, based on the determining of the first meeting or the subsequent meeting, at least one of:
       when the review meeting is determined to be the first meeting, assigning a first reviewee action items and a first reviewer action items corresponding to the action items extracted from the meeting document based on the reviewee content and the reviewer content identified during the review meeting; and
       when the review meeting is determined to be the subsequent meeting,
          determining a status of a previously assigned reviewee action items and a previously assigned reviewer action items; and
          assigning a second reviewee action items and a second reviewer action items based on the status of the previously assigned reviewee action items and previously assigned reviewer action items respectively, wherein the second reviewee action items comprises at least one of a fresh reviewee action items and an extended reviewee action items indicating an extension of the previously assigned reviewee action items, and wherein the second reviewer action items comprises at least one of a fresh reviewer action items and an extended reviewer action items indicating an extension of the previously assigned reviewer action items.

13. The medium as claimed in claim 12, further comprising instructions to determine the status of the previously assigned reviewee action items and the previously assigned reviewer action items by:

extracting the status from the task tracking unit or from the reviewee content and the reviewer content using a Natural Language Processing (NLP) technique.

14. The system as claimed in claim 7, wherein the extracting unit further configured to:
perform sentiment analysis on data extracted from one or more sources;
summarize the data, extracted from the one or more sources, in the meeting document to the reviewer and reviewee; and
forecast meaningful insights based on the summarization by using at least one of an Auto Regressive Integrated Moving Average (AMNIA) and Long Short Term Memory (LSTM).

* * * * *